Sept. 17, 1968  P. E. MEYER  3,401,501

EMULSION TREATERS AND EMULSION TREATING METHODS

Original Filed March 8, 1965

INVENTOR.
PAUL E. MEYER
BY Arthur L. Wade
ATTORNEY

United States Patent Office 3,401,501
Patented Sept. 17, 1968

3,401,501
EMULSION TREATERS AND EMULSION
TREATING METHODS
Paul E. Meyer, Tulsa, Okla., assignor to Combustion Engineering, Inc., New York, N.Y., a corporation of Delaware
Continuation of application Ser. No. 437,875, Mar. 8, 1965. This application July 28, 1967, Ser. No. 656,948
4 Claims. (Cl. 55—9)

ABSTRACT OF THE DISCLOSURE

A tall, vertical, cylindrical shell receives an oil well production and passes it through various vertically spaced internal compartments within which the forces of gravity, heat and an electrostatic field are applied to separate the production into its components.

Figure 1:
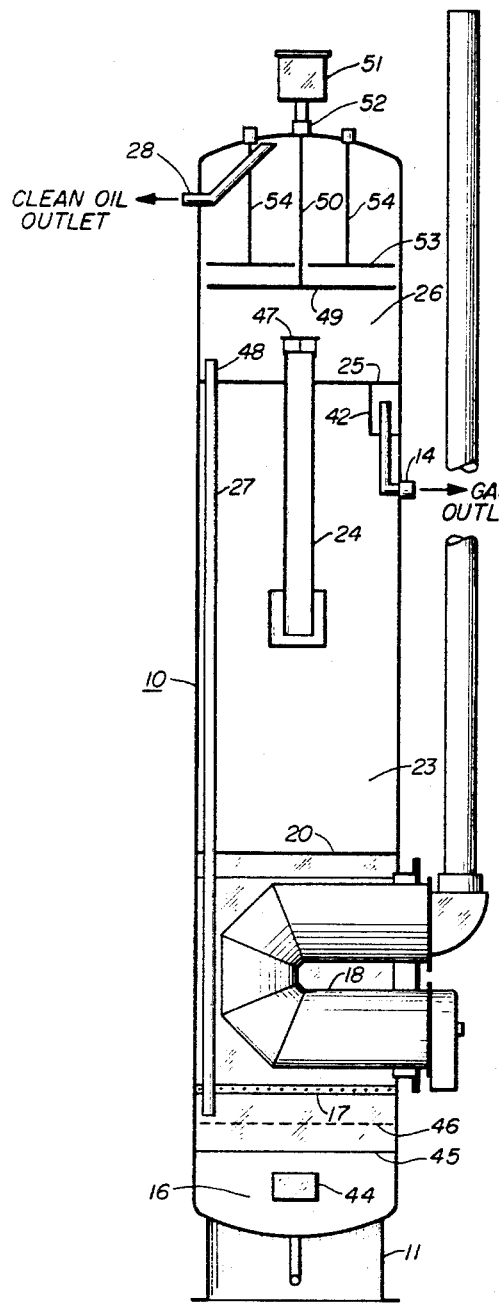

This application in a continuation of application Ser. No. 437,875, filed Mar. 8, 1965, and now abandoned.

The present invention relates to the vertically extended type of vessel in which the oil and emulsion of raw well production is initially processed to reduce the percentage of foreign matter, such as water, to a value low enough to be accepted for pipe line transport. More specifically, the invention relates to an arrangement of a heater and electrical coalescing section within the vertically extended shell of an emulsion treater.

Raw oil well production may contain varying percentages of water and gas. Generally, the oil is bound quite tightly into emulsions with water. Also, generally, whatever gas is entrained within the oil is responsible for quite a bit of foam.

The thermal heater applies heat to significantly reduce the water and gas content and lower the viscosity of the oil and emulsion prior to passing the oil and emulsion through a coalescing section. The use of electrostatic apparatus employing high voltage to coalesce water within properly heated emulsions is now quite common. It is relatively easy to arrange the thermal apparatus and electrostatic apparatus in separate compartments of a horizontally extended shell. However, when the shell is limited to vertical extension, there are many problems in placing the electrical section so it is readily assessible for service while maintaining an interface between the emulsion and salt water as an effective electrode.

A principal object of the present invention is to improve the fabrication of an electric coalescing section within a vertical shell of an emulsion treater.

Another object is to improve the accessibility of an electric section to service and replacement while providing the coalesced water as an effective electrode.

Another object is to control the discharge of the water developed by both the thermal section and the electrostatic section with a single set of controls.

The present invention contemplates a vertically extended shell within which a thermal section is located near the lower end and an electrostatic coalescing section is located within the upper end of the vessel shell. Means for supporting the electrodes of the electric section are readily mounted through the top of the vertical shell to extend down within the upper compartment to support the electrodes. The transformer supplying the electrodes is readily mounted on the upper end of the shell and the bushing for the electric lead between the transformer and the electrodes also readily mounted through the top of the shell. Internal of the upper compartment, a conduit is provided to draw water which is developed in the coalescing section by the electrodes to the collection of water developed in the lower part of the treater by the thermal source while the surface of the water coalesced is held at a position below the electrodes to function as an effective grounded electrode. The combined collections of water are then discharged from the shell under regulation of a single control system.

Figure 2:
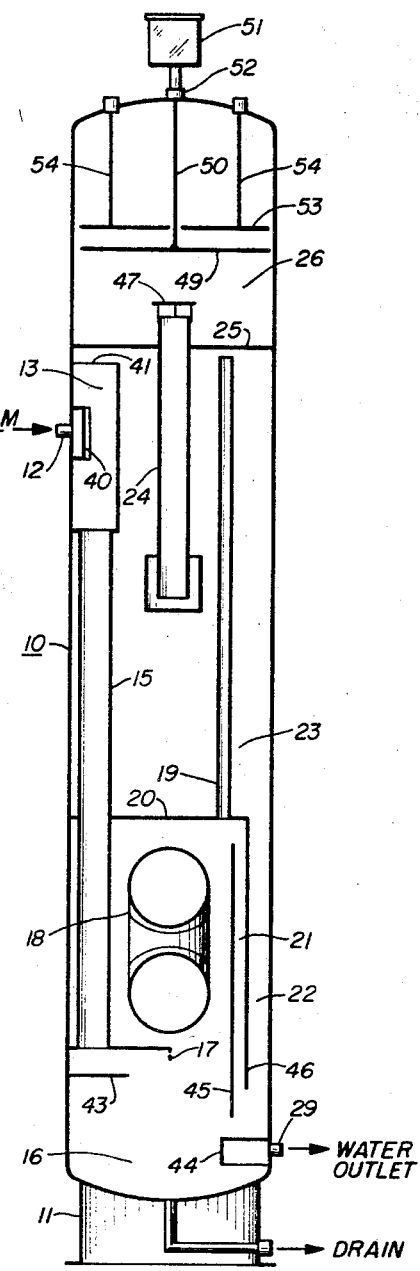

Other objects, advantages and features of this invention will become more apparent to one skilled in the art upon consideration of the written specification, appended claims, and attached drawings, wherein:

FIG. 1 is a diagrammatic sectioned elevation of a vertically extended vessel in which the present invention is embodied; and FIG. 2 is also an elevation taken at 90 degrees from the view of FIG. 1.

Reference will be made freely to both FIGS. 1 and 2, they being only different views of the same structure. The basic structure is vertically extended shell 10 within which the present invention is practiced. This vertically extended shell is mounted on a base 11 and raw well production is introduced into it through conduit 12. This raw oil well production is specifically introduced into a chamber 13 from which gaseous products are released to flow out conduit 14. The liquids of separation chamber 13 are conducted through downcomer 15.

Any free water in the liquids is given an opportunity to settle from the oil and emulsion in lower chamber 16. The lighter oil and emulsion of the liquids is spread by structure 17 beneath firetube 18. The oil and emulsion flowing upward over the firetube 18 has its temperature raised with consequent lowering of its viscosity. Additional water falls from this heated emulsion and evolved gaseous products are conducted by upcomer 19 to flow from gas outlet conduit 14.

Firetube 18 is completely covered by oil and emulsion and therefore directly transfers its heat into these liquids. These liquids flow upward to spread against the underside of baffle 20 and are diverted down through passage 21 for release to flow upwardly in passage 22.

The heated oil and emulsion rises in chamber 23. This oil and emulsion has been thoroughly degassed by the heating and is now ready to pass through the coalescing section in the upper part of the shell 10. The oil and emulsion in chamber 23 have a surface down upon which the gas pressure of separator 13 and upcomer 19 is imposed. A back-pressure valve in conduit 14 keeps this gas pressure value high enough to force the oil and emulsion of chamber 23 up conduit 24. Conduit 24 extends through baffle 25 and is released in the bottom of chamber 26 for continued flow upward through electrodes in chamber 26.

The electrodes coalesce water from the heated and degassed emulsion and this water falls to the top of baffle 25. Conduit 27 extends above the upper surface of the baffle 25 to skim off the coalesced water and maintain an interface between the water and emulsion to act as a grounded electrode which will extend the electrostatic field downward, over substantially the complete volume of chamber 26. The water flowing down conduit 27 joins the water in chamber 16. The clean oil resulting from this exposure to the electrodes flows from the shell through conduit 28 as the product of the process. All of the water developed from the raw well production, collected in chamber 16, in conducted from the chamber by conduit 29.

*First gas separation*

Conduit 12 introduces the raw well production into shell 10. More specifically, a diverter plate 40 is mounted over the exit of conduit 12 and the fluids impinge on the plate and flow over the inside wall of chamber 13. This diversion of the fluids, spreading them over a surface, aids in the release of the free gaseous components of the production. This gas flows out the open top 41 of chamber 13 and out conduit 14. A shield 42 is mounted around the end of conduit 14 to militate against liquids going out conduit 14 with the gas.

Free water separation

Conduit 15, as a downcomer, carries the liquids of the production to the bottom of the shell 10. A plate 43 is placed beneath the lower end of conduit 15 and the liquids thereby diverted into a horizontal plane.

Oil and emulsion starts to rise and the water starts to settle. The rising oil and emulsion hits the underside of plate 17. Any number of arrangements of perforations can be employed to distribute the oil and emulsion along the length of the firetube to facilitate heating such rising liquids.

The free water, or that water bound up loosely in the emulsion, collects in the chamber 16 of the shell. The draw-off through conduit 29 is controlled in one of several ways. Preferably a siphon is used in the disclosed structure. A shield 44 is provided about the end of conduit 29 to militate against oil and emulsion flowing out with the water.

Heating

The raw production may have had chemical introduced into it up the line from the unit disclosed here. Chemical is a well-known material for reducing surface tension of water droplets dispersed in oil. Heat is another force which will lower viscosity, reduce surface tension and help subsequent coalescence of the droplets of water.

The heating of the rising oil and emulsion is generally a well-known technique. The heating of oil and emulsion raises the liquids to their bubble point and gaseous material is evolved. This gas, evolved by heat, rises and collects beneath baffle 20. Upcomer conduit 19 then takes this material directly upward to join the gaseous material flowing from the first separation. Both gases mingle to flow out conduit 14 together.

Specific provisions are made to keep the level of oil and emulsion below firetube 18 beneath baffle 20. Vertical baffles 45 and 46 are arranged to form passages 21 and 22 so the oil and emulsion will flow up and over tube 18, down passage 21 and up passage 22 while the interface between oil and emulsion and water is maintained below tube 18.

This in-oil firing of tube 18 transfer heat directly into the oil and emulsion. Fuel is saved by this direct heating. Also, the tube is less likely to collect scale and therefore develop hot spots which will lead to failure of the walls of the tube.

The heated oil and emulsion from passage 22 collects in shell 10 and within chamber 23. With a siphon controlling conduit 29, an interface of oil-emulsion and water is formed above baffle 20. The height of this collection, or the liquid-gas interface level, will depend upon the gas pressure maintained in the shell by a back-pressure valve in gas conduit 14 not shown. The gas pressure on the surface of the liquids will force the oil and emulsion up conduit 24. The emulsion, heated and degassed, is then ready to have its water coalesced by the electrical section of the unit.

Chamber 23

Chamber 23 is a departure point, a transition area between the heating by tube 18 and the coalescing above. The chamber may be large enough, relative to the fluids flowing through the unit, to enable additional water worked loose from the oil and emulsion by heat, to gravitate to lower chamber 16. Passage 22 will conduit this water downward.

Conduit 24 extends down into this chamber 23. A sump structure is mounted on the lower end of conduit 24. One function of this sump is to maintain a liquid seal on the lower end of conduit 24 so gas will not be taken up into chamber 26. The liquids flow into this sump and then up conduit 24 as forced by the gas pressure above the liquid surface and below baffle 25. The liquids flow out of the upper end of conduit 24, spread horizontally by a plate 47 mounted on this conduit.

Chamber 26

In chamber 26 the liquids are given their final separation into oil and water. Some cooling of the liquids has taken place in chamber 23, so they are below their bubble point. Gas is not to be evolved in chamber 26 for this will drastically reduce the effect of the electrostatic field in coalescing the water droplets so they will gravitate from the oil.

Downcomer 27 is a simple conduit of coalesced and gravitated water from chamber 26. However, this water is a valuable means of extending the electrostatic field in chamber 26 so it is very desirable to provide for a collection of this water in the bottom of chamber 26 with a predetermined level relative to the electrodes.

Conduit 27 has a section 48 extended above baffle 25 a predetermined distance. This arrangement maintains a level of the water at this height. This level then acts as a third electrode to extend the electrostatic field downward from the hot electrode 49. Hot electrode 49 is both structurally supported from the top of shell 10, with rod 50, and electrically connected to transformer 51 which is mounted externally and on the top of shell 10. The electrical connection is made through a suitable bushing 52. Grounded electrode 53 is suspended parallel to hot electrode 49 by means of support rods 54. As the emulsion flows upwardly, the electrodes create an electrostatic field throughout a substantial volume of chamber 26, giving full range to this force in bringing about coalescence of the water so a clean oil will be drawn off through conduit 28.

Meanwhile, the water developed in this chamber 26 mounted high in the shell 10 is drawn to the bottom chamber 16. The water, free and coalesced, is then drawn from a single chamber in this vertically extended unit under the regulation of a single control system connected to conduit 29.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The present invention having been described, what is claimed is:

1. A method of treating the production liquids of an oil well production in a vessel of vertical extension, including,
    passing oil well production into the shell of a vessel at a location from which gas of the production will separate from the liquids and free water will collect in the lower portion of the shell,
    distributing the oil and emulsion beneath a heat source in the lower portion of the shell so the oil and emulsion will flow upwardly while heating and evolving gas as their viscosity lowers,
    combining the heat-evolved gas and the separated gas and removing them together from the shell,
    passing the heated oil and emulsion upward and between electrodes charged with high voltage which will coalesce water in the liquids and cause the water to gravitate to beneath the oil and emulsion and collect to form an additional electrode as a body of water, coalescing and separating additional water within the electrodes including the water electrode, removing oil from the upper portion of the shell, passing water from the body of water in the upper portion of the shell to combine with the collection of free water in the lower portion of the shell, and removing the combined water together under the regulation of a single system.

2. A treater for the liquids of oil well production, including, a vertically extended vessel shell, a separator chamber in the shell, an inlet connected to the chamber with which oil well production is introduced into the chamber in which gas separates from the liquids, a passage extended from the separator chamber to the lower part of the shell to conduct the liquids to the lower part of the shell where free water collects, a heater mounted in the lower part of the shell to heat the oil and emulsion of the liquids directed up and over the heater, a baffle and upcomer mounted above the heater to collect gas evolved from the heated liquids and conduct the evolved gas to the gas from the separator chamber, a conduit for removing the evolved and separated gas from the shell, a passage through which heated liquids are conducted to a location above the baffle, a coalescing chamber in the upper portion of the shell, a conduit between the coalescing chamber and heated liquids through which the liquids flow upwardly into the coalescing chamber, electrodes mounted in the coalescing chamber and arranged so their electrostatic field will coalesce the water from the emulsion, means to collect a body of coalesced water in the bottom of the chamber to form an additional electrode to separate additional water in the coalescing chamber, a conduit connected to the coalescing chamber to remove clean oil, a conduit connected to the bottom of the coalescing chamber and the lower part of the treater to remove coalesced water from the coalescing chamber to the water collected in the lower part of the treater, and a single regulator to remove the combined water from the shell.

3. A method of treating oil well production, in which, oil well production is separated into its liquid and gaseous products, the liquids are passed down an elongated vertical path and diverted horizontally to facilitate gravitating of free water from the liquids, the oil and emulsion of the liquids are passed upward while they are heated to evolve gas and then downward and again upward to a zone above the heat source where additional water is developed and gravitated and gas is evolved until the temperature of the liquids lowers below the bubble point of the liquids, the oil and emulsion are then passed further upward to an upper zone above all other zones of the process by gas pressure on the surface of the liquids where an interface of water is formed as an electrode, the oil and emulsion are passed through an electrostatic field in the upper zone which is formed from a pair of charged electrodes and the third electrode formed of the water interface to coalesce water from the emulsion and pass it downwardly and produce clean oil from the upper zone, and water coalesced by the electrostatic field is passed directly from the upper zone to the lower zone through a conduit within the vessel to combine with the water gravitated from the horizontal diversion at the end of the initial elongated vertical path and water developed by heat for controlled removal through a single outlet from the process.

4. An oil well treater for oil well production, including, an elongated vertical shell, a gas-liquid separating compartment mounted within the shell at a location intermediate the top and bottom of the shell, an inlet conduit connected to the compartment for introducing oil well production into the compartment where separation of the gas from the oil and emulsion takes place, a conduit connected to the compartment and extending downwardly for passing the oil and emulsion to the lowest point in the shell where the free water gravitates from the oil and emulsion and from where oil and emulsion flow upwardly, a heater mounted in the shell where the upwardly flowing oil and emulsion will pass over the heater to heat the oil and emulsion to a temperature above their bubble point, means for collecting gas evolved by the heating and passing the gas up to join the separated gas for their combined removal, a conduit through which the oil and emulsion pass to an intermediate section of the shell for collection and gravitation of any water coalesced to droplets of sufficient size to gravitate to the lowest point in the shell, a chamber formed in the highest position of the shell, an electrical coalescing section mounted in the highest chamber and arranged to establish an electrostatic field throughout substantially the complete volume of the chamber, a conduit system connected to the upper chamber and arranged to convey the oil and emulsion collected in the intermediate section to the electrodes of the coalescing section and form an electrode of coalesced water in the lower portion of the chamber and remove coalesced water to the water already gravitated to the lowest point in the shell, a conduit connected to the upper chamber for removal of the oil, and a conduit connected to the shell for removal of all water collected in the lowest portion of the shell.

References Cited

UNITED STATES PATENTS

| | | | |
|---|---|---|---|
| 2,995,202 | 8/1961 | Glasgow | 55—45 |
| 3,043,072 | 7/1962 | Walker et al. | 55—45 |
| 3,121,055 | 2/1964 | Carswell | 204—302 |
| 3,252,884 | 5/1966 | Martin et al. | 204—302 |
| 3,255,571 | 6/1955 | Walker et al. | 55—9 |

REUBEN FRIEDMAN, *Primary Examiner.*

C. N. HART, *Assistant Examiner.*